(12) United States Patent
Chatufale

(10) Patent No.: US 6,345,805 B1
(45) Date of Patent: Feb. 12, 2002

(54) ROTARY VALVE WITH SEAT ASSEMBLY

(76) Inventor: Vijay R. Chatufale, 10950 W. Brae Pkwy. #2112, Houston, TX (US) 77031

(*) Notice: Subject to any disclaimer, the term of this patent is extended or adjusted under 35 U.S.C. 154(b) by 0 days.

(21) Appl. No.: 09/494,717

(22) Filed: Jan. 31, 2000

Related U.S. Application Data

(63) Continuation-in-part of application No. 09/477,215, filed on Jan. 4, 2000, now Pat. No. 6,279,875, and a continuation-in-part of application No. 09/477,251, filed on Jan. 4, 2000, now Pat. No. 6,260,822.

(51) Int. Cl.$^7$ ............................................. F16K 25/00

(52) U.S. Cl. ..................... 251/172; 251/175; 251/309

(58) Field of Search ................................ 251/170, 172, 251/175, 192, 309, 314; 137/533

(56) References Cited

U.S. PATENT DOCUMENTS

| | | | |
|---|---|---|---|
| 4,741,509 A | | 5/1988 | Bunch |
| 4,878,651 A | | 11/1989 | Meyer |
| 5,201,872 A | | 4/1993 | Dyer |
| 5,407,176 A | * | 4/1995 | Nevrekar ................ 251/309 X |
| 5,533,738 A | * | 7/1996 | Hoffmann ................ 251/172 X |
| 6,082,707 A | | 7/2000 | Hosie et al. |

OTHER PUBLICATIONS

Halliburton Services, "LoTorq Plug Valve", Catalog D, S–8066 Rev, pp. 1–11 Duncan, Oklahoma 73533.

FMC Fluid Control Division, General Catalog GC–2, "Weco Plug Valves, Operators & Actuators", p. 14, 15, P.O. Box 1377, Stephenville, TX 76401.

* cited by examiner

*Primary Examiner*—Kevin Lee
(74) *Attorney, Agent, or Firm*—Kenneth L. Nash

(57) ABSTRACT

A rotary plug valve is disclosed in a preferred embodiment that has two telescoping seat assemblies that fit into respective recesses provided in the valve body surrounding a passageway through the plug valve. A valve chamber is formed in the valve body into which the rotary plug may be positioned to control flow through the valve by rotation thereof. In a preferred embodiment, the telescoping seat assemblies provide an upstream and a downstream seal with the rotary plug. The telescoping seat assemblies preferably function differently when in the open and closed position so that both assemblies expand when in the open position whereas in the closed position one assembly expands and one is compressed. A line pressure surface is provided to provide a force against the plug seal seat element. The plug seal seat element and plug mate with a curved surface and the contact stress varies depending on the location along the curved surface. The line pressure surface is made large enough so that a sufficient portion of the mating surface has a contact stress greater than line pressure so as to form a fluid tight, e.g., gas tight, seal. In one preferred embodiment, the line pressure surface is made large enough so that the average contact stress is greater than line pressure. In another embodiment, the seals are comprised of a non-permeable material that is sufficiently flexible to conform to sealing surfaces.

52 Claims, 5 Drawing Sheets

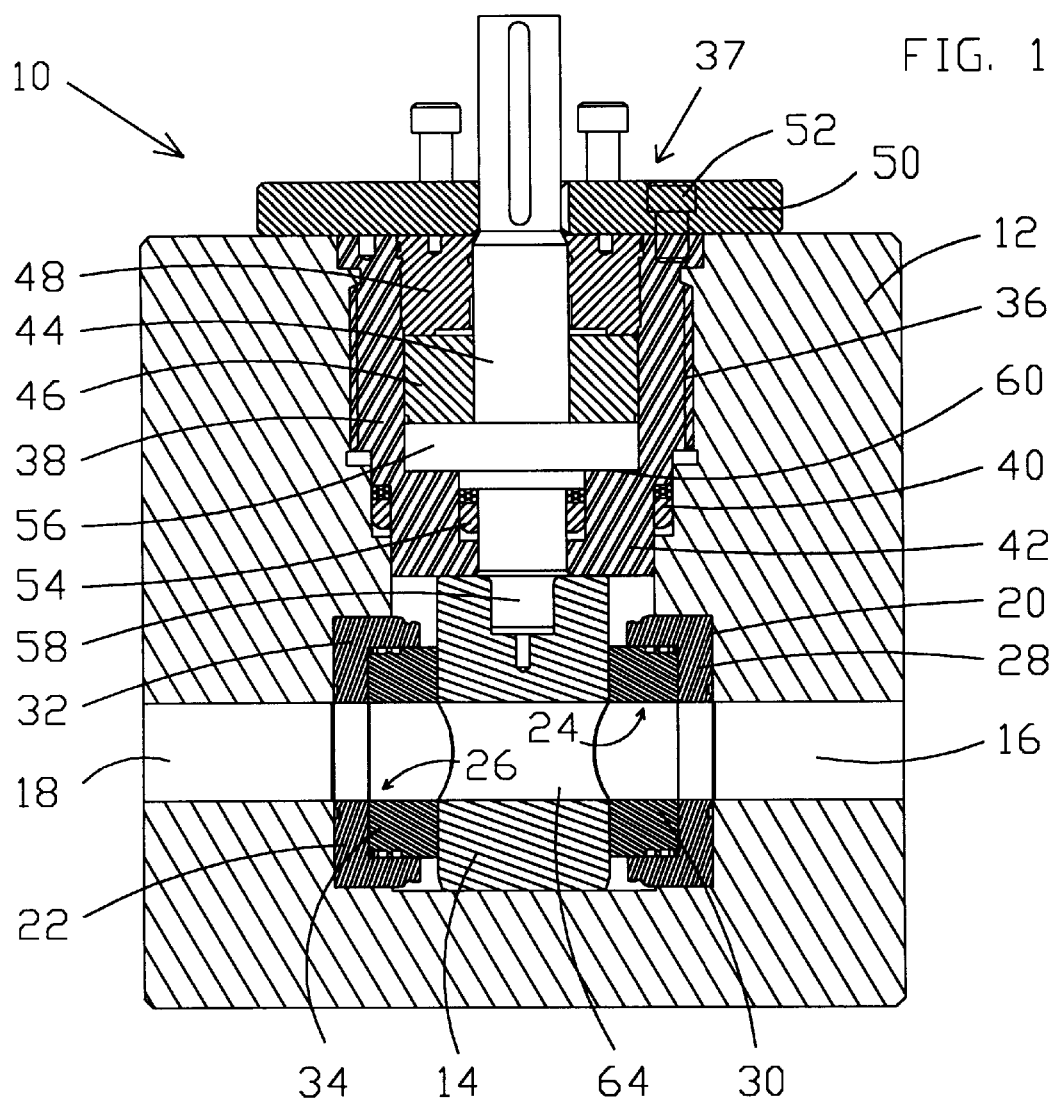
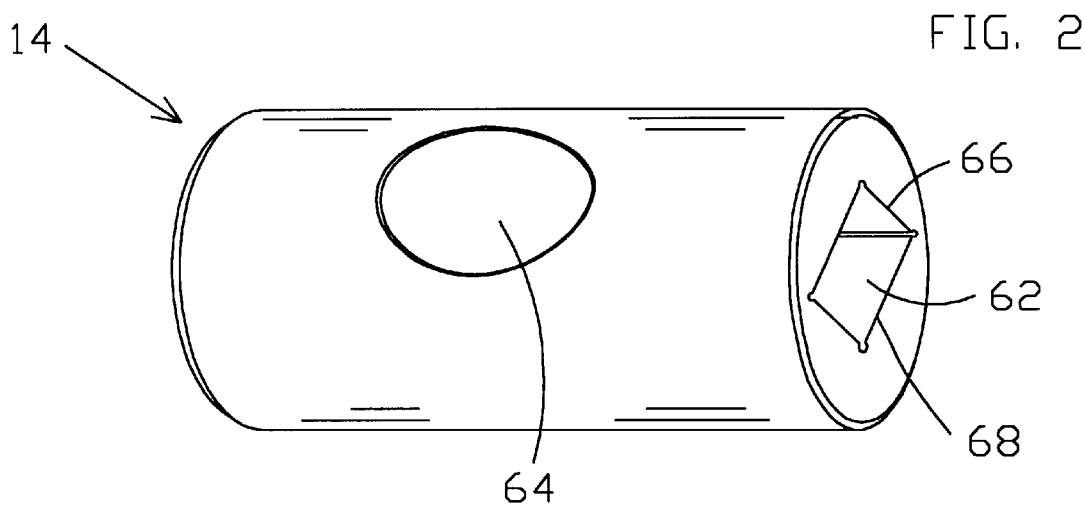

ROTARY VALVE WITH SEAT ASSEMBLY

This application is a continuation-in-part of U.S. patent application Ser. No. 09/477,215, filed Jan. 4, 2000 U.S. Pat. No. 6,279,875, and is a continuation-in-part of U.S. patent application Ser. No. 09/477,251, filed Jan. 4, 2000 U.S. Pat. No. 6,260,822.

BACKGROUND OF THE INVENTION

1. Field of the Invention

The present invention relates generally to rotary valves and, more particularly, to apparatus and methods especially suitable for a plug valve with a telescoping seat assembly.

2. Description of the Background

Telescoping seat assemblies have been known for use in gate valves for some time. One advantage of this type of seat assembly, as used in gate valves, is the ability to provide a force on the seats and valve body that varies due to pressures encountered. In this way, one is assured of a good seal with a wide range of pressures without excessive friction. Another highly desirable advantage is the possibility of upstream and downstream seals to increase valve reliability.

However, products for rotary valves such as plug valves, have not yet been able to take advantage of the benefits of telescoping seat assemblies. Techniques and construction have not been developed and the reasons for failures when attempts to use these types of seating assemblies have not been understood well enough to allow transfer of this technology from gate valves to rotary valves such as plug valves. The possibility of having the advantages of reliable upstream and downstream sealing would be especially useful if it were possible to use telescoping seating assemblies with rotary valves.

Instead, other constructions have been used to produce plug valves. These valves do not have the advantage of upstream and downstream sealing that increases the reliability of operation. One type of plug valve uses a wedge type of sealing force along with significant lubrication to maintain a primary seal whereby the plug has a taper and a nut is used to wedge the seals into the valve body adjacent the plug. However, after opening and closing several times sometimes the sealing may be less reliable. Another type of plug valve uses a floating plug that produces a downstream seal. If that seal should be lost, then there is no secondary seal to prevent leakage.

Telescoping seat assemblies in the past have relied on O-ring seals which use elastomeric material. Such O-ring seals have the advantage of being easy to effect good sealing with loose tolerances. However, when a device may be used in a wide range of temperatures, fluids, and pressures, it becomes highly difficult to ascertain that the proper O-ring will be used. Numerous types of O-rings exist with each type being suitable for different ranges of tolerances, pressures, and temperatures. The charts which have all these effects are quite complex and one must know beforehand the specific fluids, pressures, and temperatures for the application to select the correct O-ring. O-rings are also subject to the phenomena of explosive decompression when high pressures are suddenly reduced due to expansion of gas that has permeated into the O-ring. Because valves are used for a wide variety of purposes, it becomes highly probable that in some cases depending on the fluid, pressure, and temperature the wrong O-rings will be used for a particular application and the valve will leak.

Unidirectional seals made of non-elastomeric and non-permeable materials have been known that will operate under much wider ranges of temperatures, fluids, and pressures than O-rings. However, such seals do not easily effect a seal as do O-rings. The tolerances must be much tighter and the surfaces cannot tolerate imperfections. For this and related reasons, the use of non-elastomeric materials has been greatly limited. For the same reason, TEFLON based seals are not widely used even though they are inert to virtually any fluid. Such seals do not simply replace an O-ring. In fact, it is believed that these seals create additional difficulties and so have never been operational in a telescoping seat assembly prior to the invention of the parent to this application. Prior to the present invention, such seals are not known to have been used in rotary valves.

An exemplary type of telescoping valve seat assembly gate valve is shown in U.S. Pat. No. 4,878,651, issued Nov. 7, 1989, to F. W. Meyer, Jr., which is incorporated herein by reference, as a through conduit gate valve apparatus with a valve seat assembly that is field maintainable and which prevents the occurrence of pressure lock. Each valve seat assembly includes a retainer ring fixed in the valve body and a pressure responsive seat ring that seals with the gate member. The seat ring is responsive to fluid pressure in the valve flow passageways for maintaining and enhancing the face seal with the gate and simultaneously to fluid pressure in the valve chamber for automatically venting the valve chamber to present occurrence of a pressure lock condition.

Another telescoping valve seat assembly gate valve is shown in U.S. Pat. No. 5,201,872, issued Apr. 13, 1993, to M. L. Dyer, which is also incorporated herein by reference, that discloses a gate valve wherein bore pressure in the body cavity of the valve is isolated in the open and closed position. In the closed position, a double metal sealing barrier is provided across the gate. In the open position, the pressure is isolated from the stem packing and bonnet gasket by the seats on either side of the gate. Formation of hydrates in the body cavity is eliminated, and better retention of body grease is achieved during flow through the valves. Metal-to-metal seal surfaces are developed, thereby eliminating wear on the nonmetal components and reducing torque requirements.

Thus, it would be desirable to provide for the advantages of telescoping seating assemblies in a rotary valve such as a plug valve. Those skilled in the art have long sought and will appreciate the present invention which addresses these and other problems.

SUMMARY OF THE INVENTION

A rotary plug valve for controlling a line pressure is disclosed herein that comprises a valve body having a valve chamber therein. First and second passages, such as inlets and outlets, extend through the valve body and are in communication with the valve chamber to define a flow passage through the valve body. The valve is preferably bidirectional so that either end of the valve may be the upstream or downstream end. The valve body has recesses that surround the flow passages adjacent to the valve chamber. In a preferred embodiment, a cylindrical plug is mounted in the valve chamber for controlling flow through the valve body. The cylindrical plug has a first curved seal surface. A telescoping seat assembly is preferably provided in each of the recesses. Each telescoping seat assembly may include a first seat element that defines a second curved seal surface for engaging the first curved seal surface and a second seat element for engaging and sealing with the recess. The first seat element and the second seat element may be relatively moveable with respect to each other. A valve stem is provided for rotating the cylindrical plug. The cylindrical plug may be connected with the valve stem and may be secured within the valve chamber of the valve body so as to be laterally moveable in the direction the telescoping seat assemblies.

A connection between the valve stem and the cylindrical plug preferably permits the cylindrical plug to be moveable laterally toward first and the second passages. The connection may comprise a pin and socket connection wherein the pin is moveable in a least one lateral direction within the socket. In a preferred embodiment, the cylindrical plug may be secured within the valve chamber of the valve body so as to be moveable with respect to the telescoping seat assemblies when the valve is in the closed position. Thus, movement of the cylindrical plug is more restricted when the cylindrical plug is in the open position.

A line pressure area is preferably provided on the first seat element for receiving line pressure to produce a contact stress between the first curved seal surface of the cylindrical plug and the second curved seal surface of the first seat element. The contact stress varies due to location along the first and second curved sealing surfaces because of a curvature thereof. The line pressure area on the first seat element may be large enough such that the contact stress is greater than the line pressure over a sufficient portion of the first and second curved seal surfaces to produce a gas tight seal. In one embodiment, the line pressure area on the first seat element may be large enough such that an average contact stress along the first and second curved seal surfaces is greater than the line pressure.

The present invention comprises a method of making/assembling a rotary valve for controlling a line pressure that comprises providing a valve body with a valve chamber therein and providing first and second passages that extend through the plug valve body and which are in communication with the valve chamber to define a flow path through the valve body. A first recess is provided surrounding the first passage adjacent to the gate chamber and a second recess surrounding the second passage adjacent to the gate chamber. A rotary valve element is provided for the valve chamber that is rotatably moveable between an open position and a closed position.

A valve stem is provided for rotating the rotary valve closure element. A first telescoping seat assembly with first and second seat elements is provided for the first recess and a second telescoping assembly with first and second seat elements for the second recess. A line pressure surface is provided in the first telescoping seat assembly to thereby expand the first and second seat elements of the first telescoping seat assembly outwardly with respect to each other to form a seal with the rotary valve element and with the first pocket. A connection between the valve stem and the rotary valve element is provided that permits lateral movement of the rotary valve element with respect to the valve stem to thereby permit the rotary valve element to compress the first and second seat elements of the second telescoping seat assembly due to pressure on the rotary valve element when the rotary valve element is in the closed position to thereby seal with the rotary valve element and the second pocket.

A first curved seal surface is provided for the cylindrical plug and a second curved seal surface is provided on the first seat element such that a contact stress arises between the first curved seal surface and the second curved seal surface due to the line pressure acting on the line pressure surface. The contract stress varies depending on location along the first and second curved seal surfaces because of a curvature thereof. The line pressure surface on the first seat element may be large enough such that the contact stress is greater than the line pressure over a sufficient portion of the first and second curved seal surfaces to produce a fluid tight seal.

The connection between the valve stem and rotary valve element may preferably allow extended lateral movement when the rotary valve is in the closed position as compared with the open position.

A bonnet may be secured within the valve body and may be removable through a service opening in the valve body. A cylindrical plug is mounted in the valve chamber and rotatable between and open and closed position. The valve stem seal and valve stem bearing surrounding the valve stem may preferably be mounted within the bonnet. The valve stem seal and the valve stem bearing and the valve stem and the bonnet may preferably be removable as a unit through the service opening in the valve body.

It is an object of the present invention to provide an improved seat assembly for a rotary valve and especially a rotary plug valve.

Yet another object of the present invention is to provide an embodiment of the invention that may be used over wider ranges of temperature, pressure, and fluid types.

An advantage of the present invention, in a preferred embodiment, is increased reliability due to the valve preferably having both an upstream seal and a downstream seal.

These and other objects, features, and advantages of the present invention will become apparent from the drawings, the descriptions given herein, and the appended claims. The above summary and any listed objects are provided only to list information about the invention in a quickly reviewable form and are therefore not intended to limit the invention in any way not shown by the appended claims of the invention that lists features thereof and any equivalents thereof.

BRIEF DESCRIPTION OF THE DRAWINGS

FIG. 1 is an elevational view, partially in section, of a plug valve in accord with the present invention;

FIG. 2 is an elevational view of a cylindrical plug of the type that may be used in the plug valve of FIG. 1;

Figure 3:
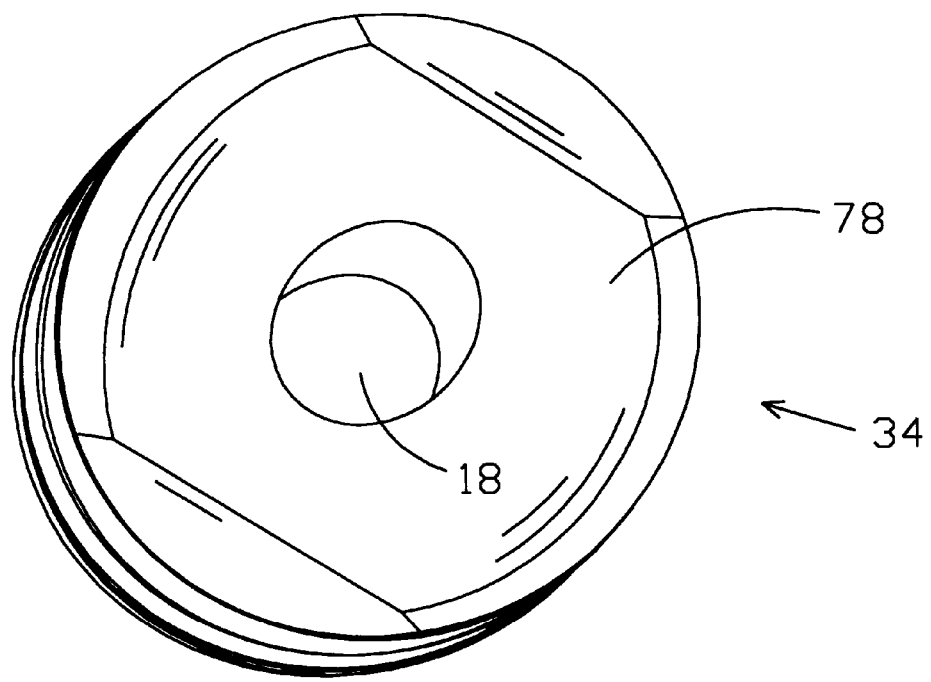
FIG. 3 is a perspective view of a plug seat element of the type that may be used in the plug valve of FIG. 1.

While the present invention will be described in connection with presently preferred embodiments, it will be understood that it is not intended that the invention is limited to those particular embodiments, but the descriptions given herein are merely to provide sufficient information such that one skilled in the art may practice one or more presently preferred embodiments of the invention, in accord with the patent statutes. Thus, the descriptions of the invention provided herein are not intended to limit the invention in any way. On the contrary, it is intended that all alternatives, modifications, and equivalents included within the spirit of the invention and as defined in the appended claims are encompassed as a part of the present invention.

DETAILED DESCRIPTION OF THE PREFERRED EMBODIMENTS

Referring now to the drawings, and more particularly to FIG. 1, where a preferred embodiment of a rotary valve, such as plug valve 10, in accord with the present invention, is illustrated. Plug valve 10 includes valve body 12 in which plug 14 is disposed for rotation. Thus, plug 14 is a rotary valve closure or control element. While the concepts used in plug valve 10 could be applied to other rotary control elements such as found in a ball valve, or tapered plug valve, or generally curved rotatable valve elements, the presently preferred embodiment incorporates a cylindrical plug 14 whose various features are discussed in more detail hereinafter.

Valve body 12 defines passageways 16 and 18 through the valve body so that flow through valve body 12 may be controlled by rotation of plug 14 shown in the open position in FIG. 1. Various flanges, interconnections, and so forth mounted on each side of valve body 12, not shown, may be used for interconnecting plug valve 10 to a flow line as known by those of skill in the art. Passageways 16 and 18, either of which may be the inlet or outlet as the valve is bidirectional, are surrounded by seal assemblies 24 and 26 that mount in body pockets 20 and 22. Each seal assembly in the presently preferred embodiment may be comprised of two telescoping seal elements. Seal assembly 24 comprises body pocket element 28 and plug seat element 30. Seal assembly 26 comprises body pocket element 32 and plug seat element 34. The seal assemblies are preferably mirror images of each other. It will be noted that plug 14 is, in a preferred embodiment, mounted without a pin connection to valve body 12 such that plug 14 floats. As discussed in further detail subsequently, plug 14 is moveable by a small amount longitudinally in the direction of passageways 16 and 18.

One feature that makes plug valve 10 convenient to work with is that all plug and seal assemblies can be readily accessed from the top. Thus, valve body 12 defines cavity 36 into which valve control assembly 37 is mounted. Valve control assembly 37 can be removed as a unit. Cavity 36 preferably is larger or at least as large in diameter as the diameter of all valve control assembly elements at the entrance to valve body 12 to thereby permit removal of all components through cavity 36. Valve control assembly includes bonnet 38 that mounts to valve body 12 with mounting means such as threads. Other means such as bolts, slots, combinations thereof, and the like may be used to secure bonnet 38 within valve body 12. Packing elements 40 surround bonnet 38 and seal between bonnet 38 and valve body 12 at bonnet extension portion 42. Bonnet 38 is cup-shaped for containing other valve control assembly components therein. Bonnet 38 holds therein operating stem 44, bearing assembly 46, and packing gland 48. A gear adaptor, such as gear adaptor 50, may be used and mounted by means of screw 52. Seals 54 seal around stem 44 below stem flange 56 that mounts within a seat 60 of bonnet 38 to stabilize the position of operating stem 44. By removing bonnet 38, such as by rotating bonnet 38, all valve control assembly elements such as packings, bearings, operating stem, and the like can be removed as one unit. This leaves free access to the plug and the seating assemblies. Therefore, valve 10 of the present invention, can be quickly and easily refurbished.

Operating stem 44 preferably has a square drive element 58 that preferably fits into rectangular socket 62 of plug 14 shown in FIG. 2. Square drive element 58 has a dimension close to that of the smaller length 66. Therefore, square drive element 58 permits movement along longer length 68 of rectangular socket 62. Thus, plug 14 and operating stem 44 are laterally moveable with respect to each other. Rectangular socket 62 is oriented with respect to plug passageway 64 as shown in FIG. 2 such that when plug 14 is in the closed position, then plug 14 is moveable in the direction of passageways 16 and 18 or more specifically in the direction of the seating assemblies. When plug 14 is in the open position, its position is more fixed and centralized. In a preferred embodiment, this feature is used with the seating assembly to effect a downstream backup seal as discussed subsequently. In a preferred embodiment, plug 14 is cylindrical. Plug 14 is typically rotated by ninety degrees to open or close valve 10. Other configurations of the pin and socket connection could be used to effect the same ends such as providing rounded ends rather than square ends of the pin socket elements for lateral movement between plug 14 and operating stem 44.

Figure 5:
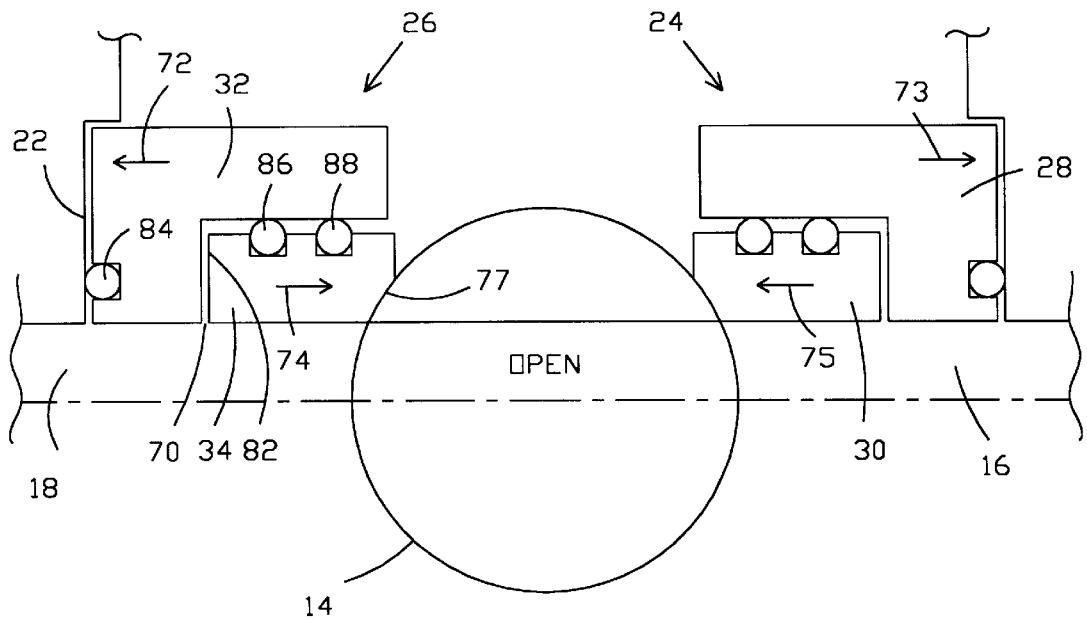
FIG. 5 is a schematical view showing a portion of the seat assemblies enlarged to explain operation of the valve when in the open position.
Figure 6:
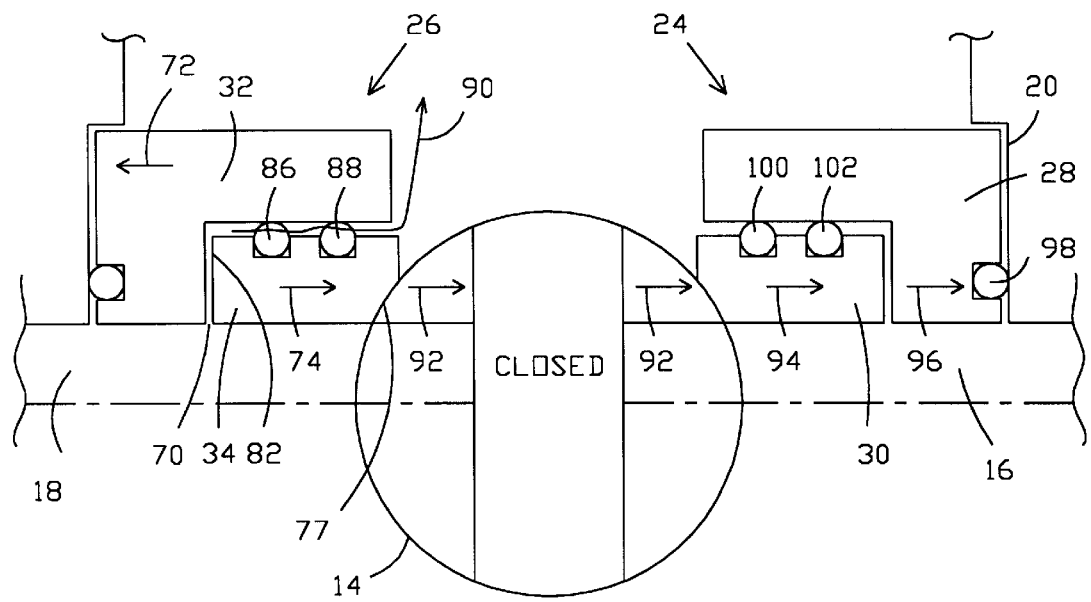
FIG. 6 is a schematical view showing a portion of the seat assemblies enlarged to explain operation of the valve when in the closed position.

FIG. 5 and FIG. 6 best illustrate operation of the sealing elements when plug valve 10 is open or closed. It will be understood that the components are shown in substantially conceptual form especially in FIG. 5 and FIG. 6 for ease of explanation and are not intended to represent manufacturing dimensions, sizes, or details. In fact, the dimensions may be exaggerated to more clearly show the features of discussion.

In FIG. 5, plug valve 10 is in the open position. Passageway 18 is presumed to be upstream and passageway 16 is presumed to be located downstream, although because seat assemblies 24 and 26 are mirror images, either seat assembly may be located upstream or downstream. With line pressure at 18 and 16 being greater than bonnet pressure, pressure at space 70 acting on surface 82, which might be referred to as a line pressure surface, will cause body pocket element 32 to move away from plug 14 as indicated by arrow 72. The line pressure will also cause plug seat element 34 to move as indicated by arrow 74 to seat against plug 14 to provide a gas tight seal at preferably metal-to-metal seal 77 between plug seat element 34 and plug 14. Seal 77 is preferably smoothly curved and may have raised portions selected as the area of the contact stress seal as desired raised areas which, if used, may be found on either plug 14 or the respective plug seating element. Seals are also provided at 84, 86, and 88 for sealing between the elements. Other seals may be used in additional or instead of these seals. With plug valve 10 in the open position, seating element assembly 24 functions in the same way as seating element 26. Therefore body pocket element moves as indicated by arrow 73 and plug seat element 30 moves as indicated by arrow 75.

Figure 4:
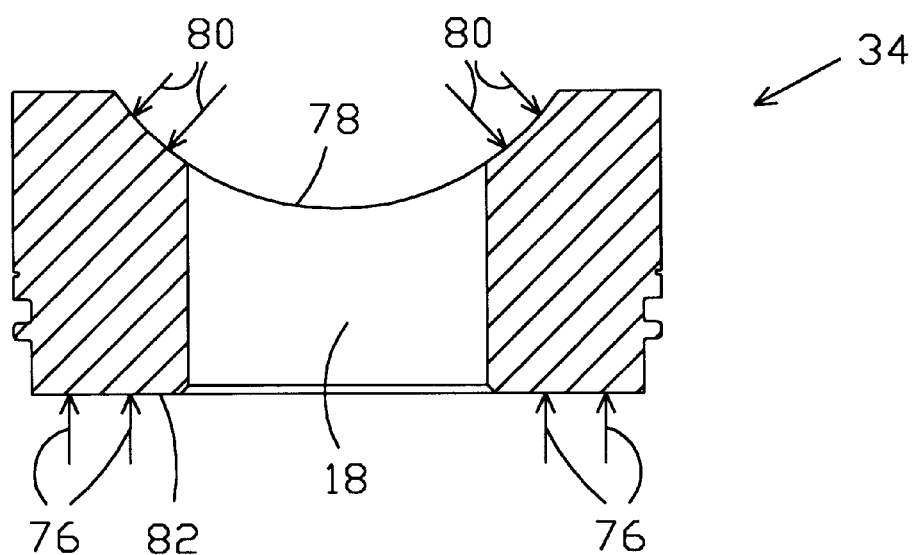
FIG. 4 is an elevational view, in section, of the plug seat element of FIG. 3.

Special construction steps are taken in the present invention to provide that the contact stress applied by plug seat element 34 against the rounded and preferably cylindrical plug 14 is great enough to produce a gas tight seal. For this purpose, the contact stress must be greater than the pressures that are to be contained. Referring to FIG. 4, pressure lines 76 produced by line pressure in space 70 move plug seal element 34 in a line substantially parallel to passageway 18 through plug seat element 34. As the pressure increases, the contact stress will also increase. The force due to line pressure is parallel to pressure lines 76. However, due to rounded engagement surfaces, such as seat surface 78 that engages plug 14, engagement contact stress lines 80 are offset in direction from the direction of pressure lines 76. The force of pressure lines 76 is applied as contact stress at an offset direction with respect to pressure lines 76. Due to the rounded surface, the component of force parallel to stress lines 80 that produces the contact stress to effect sealing will therefore be reduced at surface 78. The forces or contact stress lines 80 will also vary in strength due to their relative position along surface 78. This is indicated in FIG. 4 by the varied size of contact stress lines 80. The variation in contact stress is due to the changing angle of contact because surface 78 due to curvature thereof. As curved surface 78 becomes more parallel to passageway 18, or more perpendicular with respect to pressure lines 76, the contact stress sealing force decreases all other factors staying the same. As curved surface 78 becomes more perpendicular to pressure lines 76, the contact stress force increases. At one point in the center of the curved contact surface, the contact stress force will be equal to the pressure force due to pressure lines 76, but offset from the center the contact stress will be less than the pressure force created by pressure lines 76.

Rounded, preferably cylindrically shaped surface 78 is shown again in FIG. 3. Due to the reduced force available at surface 78, the surface area 82, which may be referred to as the line pressure area, is according to the present invention, increased to produce larger contact stress lines 80 which force causes two curved surfaces to engage with a contact stress sufficiently high to thereby seal the pressure. To effect increased contact stress lines 80, pockets 20 and 22, in FIG. 1 must be made sufficiently large that the seating elements will be able to generate this force.

Various factors are involved in the size of the force needed, e.g., the size of plug hole 64. As plug hole 64 is made smaller, then less force will be required to produce a gas tight seal around it. As plug 14 is made smaller, then more force will be required to seal around the same size plug hole 64 and so the seat assemblies have to made larger. The present system shown uses components sized to provide standard flow through hole 64 with a valve that is reasonably sized. In this configuration, it has been found that providing pockets 20 and 22 to contain elements including plug seal elements 30 and 34 of sufficient diameter that the force generated produces an average contact stress along surface 78 in the direction toward the plug greater than the pressure to be contained. For instance, to seal line pressure at 1000 pounds per square inch, then the average of contact stress lines 80 must be effectively greater than 1000 pounds per square inch remembering that contact stress lines 80 vary. The size of surface 82 then must be large enough to produce pressure lines 76 that will have sufficient resultant forces in the direction of contact stress lines 80.

In one aspect of the invention then, it is possible to increase contact stress lines 80 by increasing surface area 82 or the diameter of plug seal element 34. This increased diameter of plug seal element 34, requires an increased internal diameter of pocket seal element 34. The increased internal diameter of pocket seal element 34 may come from an increased pocket size. In one embodiment, the average of contact stress lines 80 is determined. The average contact stress 80 will be smaller than the force produced by pressure lines 76. In this embodiment, the size of 82 is preferably made sufficient to ensure that this average force is greater than the line pressure. Thus, a sufficient portion of seal surfaces 77 are greater than line pressure to ensure a fluid tight, e.g., gas tight seal. In this specification, the terms fluid tight and gas tight are effectively interchangeable. Again, it should be understood that the determination of the necessary size of line pressure surface 82 is based on factors such as the plug diameter, the relative plug hole diameter and the size of the valve that is practical for use so that use of the average contact stress 80 techniques may not be suitable for sealing with all possible combinations of relatively sized elements such as plug diameter, plug hole, and pocket diameter and valve size.

When plug valve 10 is closed as indicated in FIG. 6, then the upstream seating assembly, such as assembly 26 in the present example, acts differently from the downstream assembly even though the upstream and downstream seating assemblies are mirror images. In FIG. 6, pressure at 70 will again cause body pocket element 32 to move away from plug 14 as indicated by arrow 72. The line pressure will also cause plug seat element 34 to move as indicated by arrow 74 to seat against plug 14 to provide a gas tight seal at a preferably metal-to-metal seal contact between plug seat element 34 and plug 14. This forms the primary upstream seal. However, for the purpose of analyzing operation, suppose a leak occurs through the primary seal as indicated by arrow 90 that suggests leaking across seals 86 and 88. The present invention preferably provides a secondary seal as discussed. Plug 14 moves parallel along in the direction of passageways 16 and 18, or toward the secondary sealing assembly, in this example sealing assembly 24. This movement is indicated by arrows 92. As discussed earlier, socket 62 from FIG. 2, is rectangular thereby permitting movement in this direction when the valve is closed. Plug 14 is not otherwise pinned and so is floating although the actual amount of movement may be quite limited. Movement of plug 14 causes plug seat element 30 to move in the direction of arrow 94, which in turn moves body pocket element 28 against pocket 20 as indicated by arrow 96. Pocket 20 prevents further movement. The movement by gate 14 against plug seat element 30 produces a gas tight seal. The movement also compresses seal 98 to prevent leakage between body pocket element 28 and pocket 20. Other seals, such as metal-to-metal seals, may also be used. Seals 100 and 102 prevent leakage between seating elements 28 and 30. Therefore, a reliable secondary seal is formed that will consistently maintain a gas tight seal if the primary seal leaks.

Variations of the above design will include structural sizes that will, as discussed above, alter the forces that cause the valve to operate. Two telescoping elements are preferred for each seating assembly but other numbers from one to three or more might use the same principles of operation. As well, different types of seals may be used such as seals that have high temperature operating characteristics and the like. A preferred unidirectional seal element 118 has two oppositely directed lip seals 132 and 134 as is shown most conveniently on seal element 136. Such seal elements are discussed in more detail in the parent case, U.S. patent application Ser. No. 09/477,215, filed Jan. 4, 2000, and U.S. patent application Ser. No. 09/477,251, which are incorporated herein by reference. Seal element 136 may be of the same general seal construction as seal element 118 in this embodiment. Lip seals 132 and 134 preferably have a rounded surface so as to make a point contact seal. Thus, seal element 118 preferably makes a point contact seal with surface 128 and surface 124 so as to effect sealing therebetween. Seal element 136 and 118 include bias spring 138 that biases lip seals 132 and 134 in opposite directions with respect to each other. A preferred unidirectional seal is generally U-shaped which description is also intended to describe winged or V-shaped seals that have an open end 140 and an opposite closed end 142, as indicated on seal element 136. The material of the lip seals is preferably a polymer or thermoplastic that has little or no memory, although conceivably a soft metal material might also be used. In other words, the lips seals should be comprised of a material that is substantially non-elastic but is sufficiently pliable or flexible enough to act as a good seal material by conforming to sealing surfaces 124 and 128. The selected material should also be non-permeable so as to avoid the problem that many O-rings have of absorbing gasses under pressure and subsequently expanding or exploding when the pressure is released. The material should have a high temperature/pressure rating and be resistant or inert with respect to caustic and acidic fluids and other fluids such as those found in oil and gas wells or pipelines. Various materials are available for this purpose including polymers, thermoplastics, PEEK (polyetheretherketone), PES (polyethersulfone), PTFE (polytetrafluroroetheylene), and the like.

Figure 7:
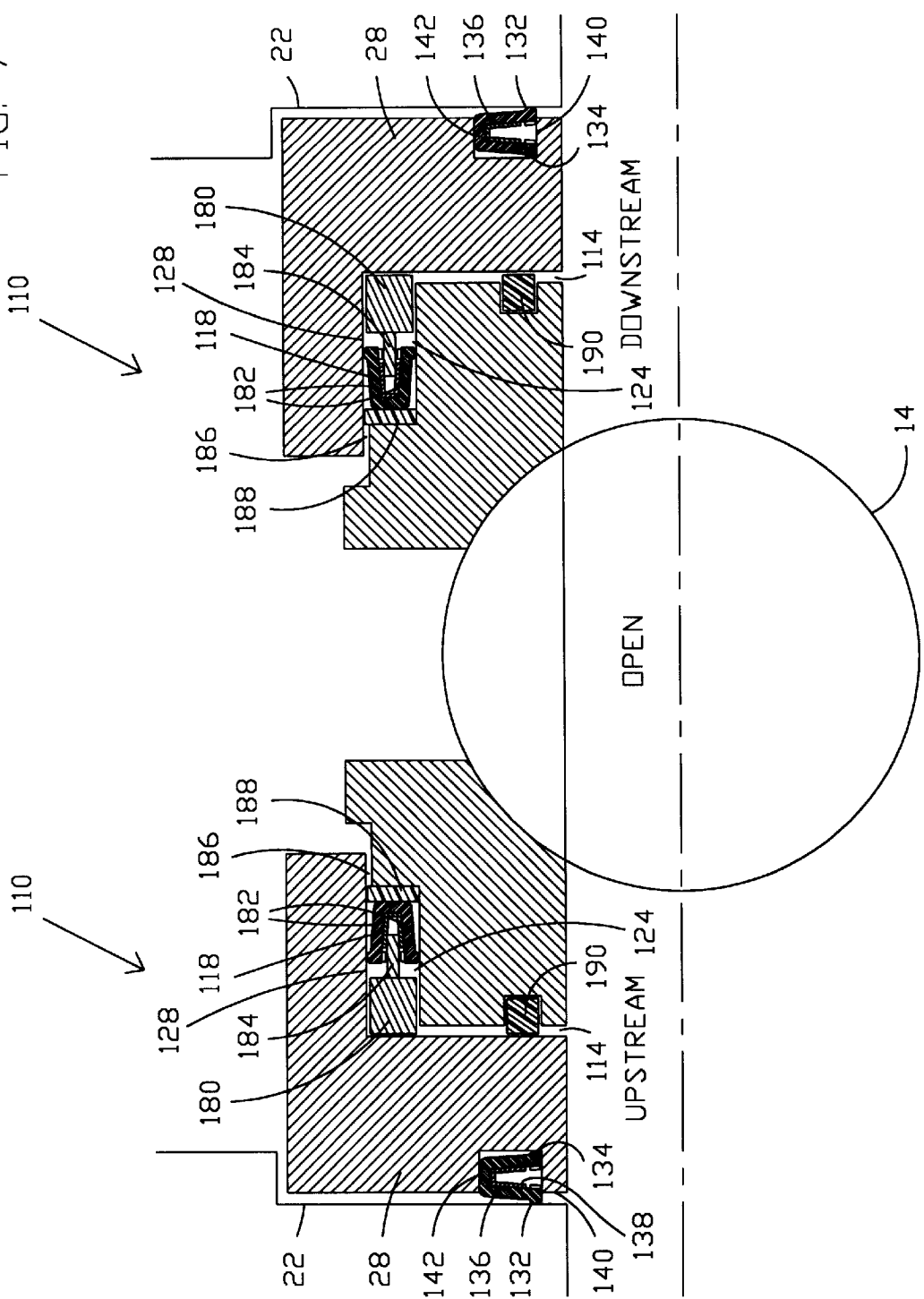
FIG. 7 is a schematical view in the open position showing seat assemblies that do not have elastomeric O-rings.
Figure 8:
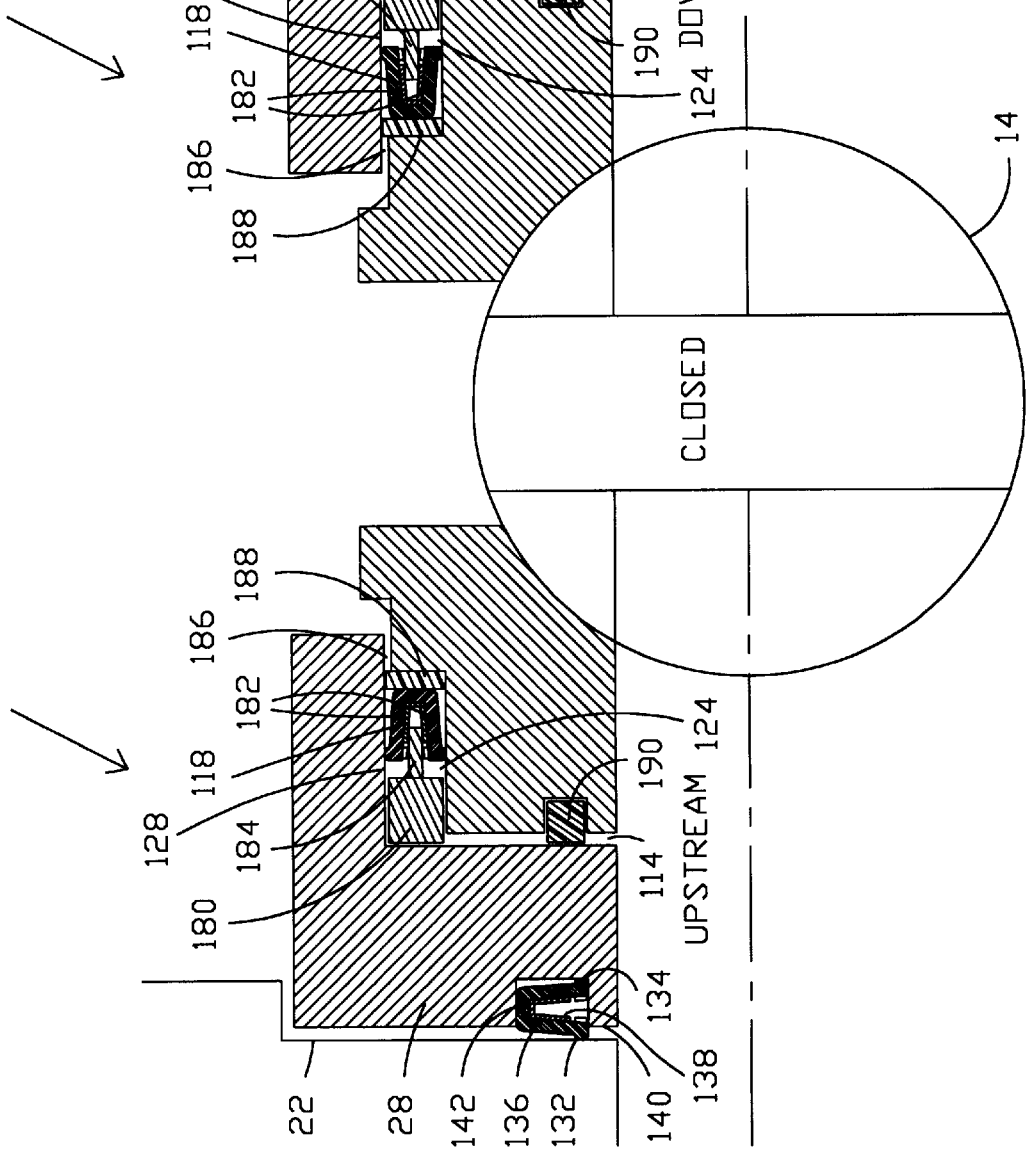
FIG. 8 is a schematical view in the closed position of the seat assemblies of FIG. 7.

FIG. 7 and FIG. 8 disclose a presently preferred embodiment of the present invention for use in sealing applications involving wide ranges of temperature, pressure, and types of fluid. The general operation of the seating elements, but not the seals, is the same as described with respect to FIG. 5 and FIG. 6 wherein both the upstream and downstream mirror image assemblies are included to aid in understanding of operation. The embodiment of FIGS. 7 and 8 includes U-shaped seal elements 118 and 136. Other elements are added to facilitate operation. Spreader rings 180 are used to ensure expansion of legs or wings 182 of U-shaped elements 118 to thereby more positively ensure sealing, especially initial sealing, and avoid leaking. Spreader rings 180 include spread shaft 184 that engages and expands wings 182. Shaft 184 may have beveled, curved, or sloping sides for engagement with the inner surfaces of seal elements 118, as desired. While not the presently preferred embodiment, spring loading could be used for engaging spring 180 with wings 182.

Due to the telescoping nature of seating elements 110, a gap 186 is present that, under high pressure conditions, might cause extrusion damage to seals 118. Therefore, an anti-extrusion ring 188 is preferably provided for each seal 118 to remove this possibility. Anti-extrusion ring 188 is preferably a non-metallic material such as PEEK or other such material as discussed above. A seal ring element 190 is provided in passageway 114 that, although an upstream/downstream mirror image, will operate differently depending on conditions such as valve open or closed and whether placed at the upstream or downstream. Seal ring element 190 may be comprised of a non-metallic material suitable for high temperature operation, such as TEFLON. TEFLON is inert to virtually all fluids. As discussed above, the mirror image arrangement allows either end of valve 10 to be used as the input or output.

Assuming valve 10 is closed and the upstream pressure is higher than downstream pressure as shown in FIG. 8, upstream or primary seal elements 110 normally provide a gas tight seal over a wide temperature operating range. Upstream high temperature seal 136 prevents leakage past element 28. Pressure in upstream passageway 114 forces element 102 into engagement with pocket 22 to enhance sealing of seal 136. Likewise, pressure in 114 forces element 104 of the upstream seal against valve element 124. Upstream seal element 118 normally prevents flow through element 102 and 104. Element 190 normally allows some leakage in the upstream seal assembly. This leakage allows excessive pressure to flow through 114 if line pressure drops to prevent pressure lock. This leakage also allows line pressure along the length of passageway 114 to produce more sealing force acting on element 102 and 104 towards pocket 28 and gate 124, respectively.

To understand the backup functioning of valve 10 assume that for some reason, the primary seal fails so as to leak when the valve is closed as shown in FIG. 8. The higher pressure of the upstream as compared to the downstream has moved plug 24 axially towards downstream. The axial movement of plug 24 causes downstream seal 190 to be compressed and seals off downstream passageway 114. Thus, even though pressure might otherwise flow past downstream element 118 due to a higher pressure at its closed end, activation of seal 190 prevents such flow. Likewise, even though pressure might otherwise flow past downstream seal 136 at downstream pocket 22, compression of downstream element 28 against downstream pocket 22, further activates seal 136 to prevent leakage. Other seal elements could also be used between pocket 22 and element 28 such as metal seals, additional U-shaped seals such as seal 170 shown in FIG. 4 and the like. However, it has been found that additional seals between pocket 22 and element 28 have not been necessary due to the axial movement of gate 124 that further compressively activates seal 136. The metal-to-metal seal with the gate valve is also activated in this manner. Thus, valve 10 is designed to have a highly reliable primary seal but also includes a backup secondary seal so as to make valve 10 extremely reliable.

As in the above embodiments, when valve 10 is open both the upstream and downstream assemblies operate in the same manner whereby the elements telescope away from each other to seal against the pocket and gate. The passageway 114 is sealed off by element 118 as additionally activated by spreader ring 180.

The foregoing disclosure and description of the invention is illustrative and explanatory thereof, and it will be appreciated by those skilled in the art, that various changes in the size, shape and materials as well as in the details of the illustrated construction or combinations of features of the various actuator elements may be made without departing from the spirit of the invention.

What is claimed is:

1. An assembly for a rotary plug valve for controlling a line pressure, a valve body for said rotary plug valve having a valve chamber therein, first and second passages extending through said valve body and being in communication with said valve chamber to define a flow passage through said valve body, said valve body having a recess surrounding said flow passage adjacent to said valve chamber, a rotatable valve stem disposed in said valve body, said rotatable stem having a stem axis, said assembly comprising:

a cylindrical plug mounted in said valve chamber for controlling flow through said valve body, said cylindrical plug having a curved plug seal surface;
   a telescoping seat assembly in each of said recesses, each said telescoping seat assembly including,
      a first seat element defining a curved seat seal surface for engaging said curved plug seal surface; and
      a second seat element for engaging and sealing with said recess, said first seat element and said second seat element being relatively moveable with respect to each other, said cylindrical plug being connected with said valve stem, said cylindrical plug being mounted within said valve chamber of said valve body so as to be moveable transversely to said stem axis in response to line pressure acting on said cylindrical plug when said cylindrical plug is rotated to a closed position.

2. The assembly of claim 1, further comprising:
   a connection between said valve stem and said cylindrical plug that permits said cylindrical plug being moveable laterally from said valve stem toward first and second said passages.

3. The assembly of claim 1, further comprising:
a unidirectional seal element disposed between said first seat element and said second seat element.

4. The assembly of claim 3, wherein said unidirectional seal element further comprises:
two lip seals being comprised of a non-permeable material.

5. The assembly of claim 3, further comprising:
said unidirectional seal element having an open end,
a spreader member for extending into said open end for spreading said two lip seals outwardly with respect to each other.

6. The assembly of claim 3, further comprising:
a non-elastomeric seal ring disposed between said first seat element and said second seat element.

7. The assembly of claim 6, further comprising:
said non-elastomeric seal ring is sized such that leakage may occur past said non-elastomeric seal ring when said first seat element and said second seat element are expanded telescopingly outwardly with respect to each other.

8. The assembly of claim 2, wherein said connection further comprises:
a pin and socket connection wherein said pin is moveable in a least one lateral direction within said socket.

9. The assembly of claim 1, wherein:
said cylindrical plug being secured within said valve chamber of said valve body so as to be more moveable with respect to said telescoping seat assemblies when said valve is in said closed position as compared to when said valve is in said open position.

10. The assembly of claim 1, further comprising:
a line pressure area on said first seat element for receiving line pressure to produce a contact stress between said curved plug seal surface of said cylindrical plug and said curved seat seal surface of said first seat element, said contact stress varying due to location along said curved plug seal surface and said curved seat seal surface because of a curvature thereof, said line pressure area on said first seat element being large enough such that said contact stress is greater than said line pressure over a sufficient portion of said curved plug seal surface and said curved seat seal surface to seal therebetween.

11. The assembly of claim 1, further comprising:
a line pressure area on said first seat element for receiving line pressure to produce a contact stress between said curved plug seal surface and said curved seat seal surface of said first seat element, said contact stress varying due to location along said curved plug seal surface and said curved seat seal surface because of a curvature thereof, said line pressure area on said first seat element being large enough such that an average contact stress along said curved plug seal surface and said curved seat seal surface is greater than said line pressure.

12. A method of assembling a rotary valve for controlling a line pressure, comprising:
providing a valve body with a valve chamber therein;
providing first and second passages that extend through said valve body and which are in communication with said valve chamber to define a flow path through said valve body;
providing a first recess surrounding said first passage adjacent to said valve chamber and a second recess surrounding said second passage adjacent to said gate chamber;
providing a rotary valve element for said valve chamber that is rotatably moveable between an open position and a closed position;
providing a valve stem for rotating said rotary valve element;
providing a first telescoping seat assembly with first and second seat elements for said first recess and a second telescoping assembly with first and second seat elements for said second recess;
providing a line pressure surface in said first telescoping seat assembly to thereby expand said first and second seat elements of said first telescoping seat assembly outwardly with respect to each other to form a seal with said rotary valve element and with said valve body; and
providing a connection between said valve stem and said rotary valve element that permits lateral movement of said rotary valve element with respect to said valve stem to thereby permit said rotary valve element to compress said first and second seat elements of said second telescoping seat assembly due to pressure on said rotary valve element when said rotary valve element is in said closed position to thereby seal with said rotary valve element and said valve body.

13. The method of claim 12, further comprising:
providing a first curved seal surface for said rotary valve element and a second curved seal surface on said first seat element such that a contact stress arises between said first curved seal surface and said second curved seal surface due to said line pressure acting on said line pressure surface, said contract stress varying depending on location along said first and second curved seal surfaces because of a curvature thereof, said line pressure surface on said first seat element being large enough such that said contact stress is greater than said line pressure over a sufficient portion of said first and second curved seal surfaces to produce a fluid tight seal.

14. The plug valve of claim 12, further comprising:
providing a first curved seal surface for said rotary valve element and a second curved seal surface on said first seat element such that a contact stress arises between said first curved seal surface and said second curved seal surface due to said line pressure acting on said line pressure surface, said contract stress varying depending on location along said first and second curved seal surfaces because of a curvature thereof, said line pressure surface being large enough such that at least an average contact stress along said first and second curved seal surfaces is greater than said line pressure. and said second pocket.

15. The method of claim 12, further comprising:
providing that said connection comprises a pin and socket connection wherein said pin is moveable in a least one lateral direction within said socket.

16. The method of claim 12, further comprising:
providing that said connection allows extended lateral movement when said rotary valve element is in said closed position as compared to when said rotary valve element is in said open position.

17. The method of claim 12, further comprising:
providing that said rotary valve element is a cylindrical plug.

18. The method of claim 12, further comprising;
providing a unidirectional seal between said first and second seat elements of said first telescoping seat assembly and said second telescoping seat assembly.

19. The method of claim 18, further comprising:
providing that said unidirectional seal is a U-shaped seal element with an open end and a closed end, and
orienting said U-shaped seal element such that said closed end of said seal element is pointing toward said rotary valve element.

20. The method of claim 19, further comprising:
spreading said U-shaped seal element by extending a spreader member into said open end.

21. The method of claim 18, further comprising:
providing a seal ring comprised of non-permeable material between said first and second seat elements of said first telescoping seat assembly and said second telescoping seat assembly.

22. The method of claim 21, further comprising:
providing said seal ring is sized such that leakage past said second seal ring may occur when said telescoping arrangement of said first seat element and said second seat element is expanded.

23. A seating assembly for a rotary valve for controlling line pressure, said rotary valve having a valve body with a passageway therethrough and a valve chamber with a rotary valve element, said rotary valve element being rotatable between an open and a closed position and having a first curved seal surface, said valve body defining recesses on either side of said valve chamber surrounding said passageway, said seating assembly comprising:
a first telescoping seating assembly and a second telescoping assembly mountable on opposite sides of said rotary valve element and being disposed in respective of said recesses on either side of said valve chamber;
said first telescoping seating assembly comprising first and second seating elements which are moveable with respect to each other, said first seating element having a second curved seal surface for engaging said first curved seal surface of said rotary valve element, said first telescoping seating assembly having a line pressure surface on which said line pressure is receivable to produce a contact stress between said first seating element and said rotary valve element, said contact stress being variable over said first and second curved seal surfaces, said line pressure surface being sized to produce a contact stress greater than said line pressure over a sufficient portion of said first and second curved seal surfaces to produce a gas tight seal, said second seating element being moveable by said line pressure away from said first seating element to thereby seal along a respective of said recesses.

24. The seating assembly of claim 23, further comprising:
said line pressure surface being sized to produce an average contact stress over said first and second curved seal surfaces greater than said line pressure.

25. The seating assembly of claim 23, further comprising:
said second telescoping seating assembly comprising first and second seating elements that are mirror images of said first and second seating elements of said first seating assembly.

26. The seating assembly of claim 25, wherein:
said second telescoping seating assembly is configured to be compressible when said rotary valve is in said closed position such that said first and second seating elements are moveable towards each other for sealing with said rotary valve element and a respective of said recesses.

27. The seating assembly of claim 23, further comprising:
a unidirectional seal element disposed between said first and second seating elements of said first telescoping seating assembly.

28. The assembly of claim 27, wherein said unidirectional seal element further comprises:
two lip seals being comprised of a non-permeable material.

29. The assembly of claim 27, further comprising:
said unidirectional seal element having an open end,
a spreader member for extending into said open end for spreading said two lip seals outwardly with respect to each other.

30. The assembly of claim 27, further comprising:
a non-elastomeric seal ring disposed between said first seat element and said second seat element.

31. The assembly of claim 30, further comprising:
said non-elastomeric seal ring is sized such that leakage past said non-elastomeric seal ring may occur when said first seat element and said second seat element are expanded telescopingly outwardly with respect to each other.

32. A rotary valve having a valve body for containing a line pressure with a passageway extending through said valve body, said rotary valve comprising:
a rotary valve element for controlling flow through said passageway;
a stem driver for rotating said rotary valve element between an open and closed position;
first and second pairs of telescoping seating elements mounted within said valve body for sealing with said rotary valve element;
a connection formed between said rotary valve element and said stem driver to permit lateral relative movement between said stem driver and said rotary valve element in at least one direction when said rotary valve element is in said closed position.

33. The rotary valve of claim 32, wherein:
said first pair of telescoping seating elements forms an upstream seal with said rotary valve element, and said second pair of telescoping seating elements forms a downstream seal with said rotary valve element.

34. The seating assembly of claim 32, further comprising:
at least one unidirectional seal element mounted to at least one of said first and second pairs of seating elements.

35. The assembly of claim 34, wherein said unidirectional seal element further comprises:
two lip seals being comprised of a non-permeable material.

36. The assembly of claim 34, further comprising:
said unidirectional seal element having an open end,
a spreader member for extending into said open end for spreading said two lip seals outwardly with respect to each other.

37. The assembly of claim 34, further comprising:
at least one non-elastomeric seal ring disposed adjacent said at least one of said first and second seating elements.

38. A plug valve, comprising:
a valve body having a passageway therethrough and defining therein a valve chamber;
a bonnet secured within said valve body and being removable through a service opening in said valve body;
a cylindrical plug mounted in said valve chamber and rotatable between and open and closed position;
a valve stem mounted within said bonnet for rotating said cylindrical plug, said cylindrical plug being moveable laterally with respect to said valve stem;

first and second telescoping pairs of seating elements mounted on either side of said cylindrical plug.

39. The plug valve of claim 38, further comprising:

a valve stem seal and valve stem bearing surrounding said valve stem being mounted within said bonnet, said valve stem seal and said valve stem bearing and said valve stem and said bonnet being removable as a unit through said service opening in said valve body.

40. The plug of claim 38, wherein:

each of said first and second telescoping pairs of seating elements is configured to expand when said plug valve is in said open position and, when said plug valve is in said closed position said first pair of telescoping seat elements is configured to expand and said second pair of telescoping seat elements is configured to be compressed by said cylindrical plug.

41. The plug valve of claim 38, further comprising:

a pressure surface within said first telescoping pair of seating element for moving a curved seal element into contact with said cylindrical plug such that a contact stress is formed therebetween which contact stress varies over said curved seal element.

42. The plug valve of claim 38, wherein:

said pressure surface has an area sufficient to produce a contact stress greater than a line pressure over a sufficient portion of said curved seal element to produce a gas tight seal.

43. The seating assembly of claim 38, further comprising:

a unidirectional seal element disposed within said first and second telescoping pairs of seating elements.

44. The assembly of claim 43, wherein said unidirectional seal element further comprises:

two lip seals being comprised of a non-permeable material.

45. The assembly of claim 43, further comprising:

said unidirectional seal element having an open end, a spreader member for extending into said open end for spreading said two lip seals outwardly with respect to each other.

46. The assembly of claim 43, further comprising:

a non-elastomeric seal ring disposed between said first and second telescoping pairs of seating elements.

47. The assembly of claim 46, further comprising:

said non-elastomeric seal ring is sized such that leakage may occur past said non-elastomeric seal ring when said first seat element and said second seat element are expanded telescopingly outwardly with respect to each other.

48. A seating assembly for a rotary valve for controlling line pressure, said rotary valve having a valve body with a passageway therethrough and a valve chamber with a rotary valve element, said rotary valve element being rotatable between an open and a closed position and having a first curved seal surface, said valve body defining first and second recesses on either side of said valve chamber surrounding said passageway, said seating assembly comprising:

a first telescoping seat assembly for said first recess;

a second telescoping seat assembly for said second recess;

a first unidirectional seal element positioned within said first telescoping seat assembly; and a second unidirectional seal element positioned within said second telescoping seat assembly.

49. The assembly of claim 48, wherein each of said first and second unidirectional seal elements further comprises:

two lip seals being comprised of a non-permeable material.

50. The assembly of claim 49, further comprising:

each of said first and second unidirectional seal elements have an open end, first and second spreader members for extending into respective of said open ends for spreading said two lip seals outwardly with respect to each other.

51. The assembly of claim 48, further comprising:

first and second non-elastomeric seal rings disposed between respective of said first and second first telescoping seat assemblies.

52. The assembly of claim 51, further comprising:

said first non-elastomeric seal rings is sized such that leakage occurs thereby when said first telescoping seat assembly is expanded.

\* \* \* \* \*